(12) United States Patent
Sagi et al.

(10) Patent No.: US 8,620,783 B2
(45) Date of Patent: Dec. 31, 2013

(54) SYSTEM AND METHOD FOR PROVIDING REDUNDANT CUSTOMER COMMUNICATIONS DELIVERY USING HYBRID DELIVERY CHANNELS

(75) Inventors: Surya R. Sagi, Southbury, CT (US); Peter L. D'Amato, Woodbury, CT (US); Dean T DeCencio, Haddonfield, NJ (US)

(73) Assignee: Pitney Bowes Inc., Stamford, CT (US)

( * ) Notice: Subject to any disclaimer, the term of this patent is extended or adjusted under 35 U.S.C. 154(b) by 270 days.

(21) Appl. No.: 12/650,751

(22) Filed: Dec. 31, 2009

(65) Prior Publication Data

US 2011/0087571 A1    Apr. 14, 2011

Related U.S. Application Data

(60) Provisional application No. 61/250,868, filed on Oct. 12, 2009.

(51) Int. Cl.
*G07F 19/00* (2006.01)
*H04M 3/00* (2006.01)

(52) U.S. Cl.
USPC ............................................. 705/34; 379/265

(58) Field of Classification Search
USPC .......................................................... 705/34
See application file for complete search history.

(56) References Cited

U.S. PATENT DOCUMENTS

| | | | |
|---|---|---|---|
| 5,805,810 A | 9/1998 | Maxwell | |
| 6,343,327 B2 | 1/2002 | Daniels et al. | |
| 7,478,140 B2 | 1/2009 | King et al. | |
| 7,987,003 B2 * | 7/2011 | Hoffberg et al. | 700/17 |
| 2004/0044734 A1 * | 3/2004 | Beck | 709/206 |
| 2004/0093222 A1 | 5/2004 | Sipe et al. | |
| 2004/0215472 A1 | 10/2004 | Gleckman | |
| 2006/0253597 A1 * | 11/2006 | Mujica | 709/229 |
| 2008/0158615 A1 * | 7/2008 | Parkos et al. | 358/402 |
| 2008/0159520 A1 * | 7/2008 | Annadata et al. | 379/266.01 |
| 2009/0138730 A1 | 5/2009 | Cook et al. | |
| 2009/0152320 A1 * | 6/2009 | Hu | 227/132 |
| 2009/0313642 A1 * | 12/2009 | Chen et al. | 719/321 |
| 2011/0087746 A1 | 4/2011 | Sagi et al. | |

FOREIGN PATENT DOCUMENTS

| | | | |
|---|---|---|---|
| EP | 0917075 A2 | 5/1999 | |
| WO | WO 0191066 A2 | 11/2001 | |
| WO | WO 2004012109 A1 | 2/2004 | |

OTHER PUBLICATIONS

"System and method for electronic and non-electronic mass mailing", EP 0 917 075 A2, Published: Nov. 11, 1998 to Daniels et al.*
EPO—European Search Report for EP Application No. 10187245.5-2221, dated Jan. 28, 2011.
Thomson, J. "SSIS Junkie: SSIS Checking if a row exists and if it does, has it changed?" Retrieved from the intrnet: URL:http//consultingblogs.emc.com/jamiethomson/archive/2006/09/12/SSIS_3A00_-Checking- if-a-row-exists-and-if-it-does_2C00_-has-it-changed.aspx, Jan. 10, 2011.
EPO—European Search Report for EP Application No. 10187244.8-2221 Dated Feb. 21, 2011.

* cited by examiner

*Primary Examiner* — Garcia Ade

(74) *Attorney, Agent, or Firm* — Brian A. Lemm; Charles R. Malandra, Jr.; Steven J. Shapiro

(57) ABSTRACT

A system and method for providing redundant customer communications delivery using hybrid delivery channels is provided. In one configuration, the system utilizes an initial delivery channel to send a batch of customer communications and later utilizes a different, delayed backup delivery channel to resend only a subset of those communications as deemed necessary.

20 Claims, 2 Drawing Sheets

SYSTEM AND METHOD FOR PROVIDING REDUNDANT CUSTOMER COMMUNICATIONS DELIVERY USING HYBRID DELIVERY CHANNELS

CROSS REFERENCE TO RELATED APPLICATIONS

This application claims priority under 35 U.S.C. section 119(e) from Provisional Patent Application Ser. No. 61/250,868, filed Oct. 12, 2009, entitled System And Method For Providing Redundant Customer Communications Delivery Using Hybrid Delivery Channels, by Surya R. Sagi, et al., which is incorporated herein by reference in its entirety.

TECHNICAL FIELD

The illustrative embodiments of the present invention relate generally to customer communications systems and, more particularly, to a new and useful system and method for providing redundant customer communications delivery using hybrid delivery channels including an initial delivery channel and a separate, delayed backup delivery channel that is used only when deemed necessary.

BACKGROUND

Many large companies have a large number of customers and must efficiently communicate with them for various reasons such as for providing general correspondence communications, promotional communications and transactional communications. Transactional communications may include specific transaction documents or periodic transactional documents such as monthly account statements. For example, a stock brokerage company may provide trade confirmations to its customers shortly after processing a particular trade transaction and may also provide monthly account statements to each customer. Banks may provide customers with monthly bank account statements, credit card statements and loan statements. Such periodic transactional communications are typically distributed in a single physical postal service mass mailing communication such as a mass mailing processed by an automated document factory and distributed using the United States Postal Service (USPS). Certain companies may allow customers to select electronic delivery instead of physical postal service mail delivery. There is a need to ensure that such communications are properly delivered in a timely fashion.

BRIEF DESCRIPTION OF THE DRAWINGS

The accompanying drawings show illustrative embodiments of the invention and, together with the general description given above and the detailed description given below serve to explain certain principles of the invention. As shown throughout the drawings, like reference numerals designate like or corresponding parts.

SUMMARY

Figure 1:
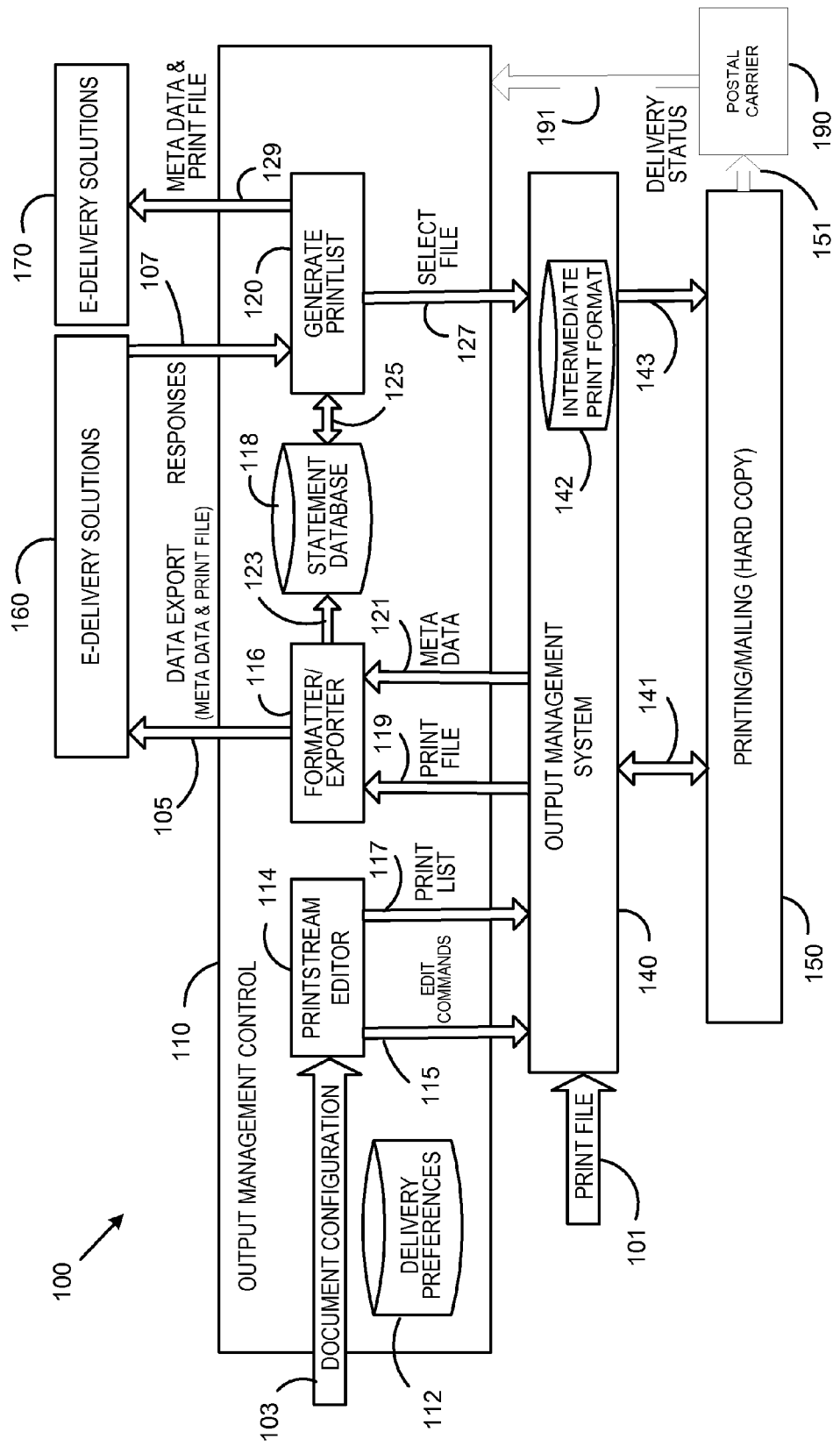
FIG. 1 is a diagram showing a system and information flow for providing redundant customer communications delivery using hybrid delivery channels according to an illustrative embodiment of the present application.

A system and method for providing redundant customer communications delivery using hybrid delivery channels is provided. In one configuration, the system utilizes an initial delivery channel to send a batch of customer communications and later utilizes a different, delayed backup delivery channel to resend only a subset of those communications as deemed necessary.

DETAILED DESCRIPTION

The present invention is described in the context of illustrative embodiments directed to new and useful systems and methods for providing selective redundant customer communications delivery using hybrid delivery channels including an initial delivery channel and a separate, delayed backup delivery channel that is used only when deemed necessary.

If a particular transactional communication includes a bill with payment due, the billing company may wish to ensure timely delivery of the bill to its customer. For example, timely delivery may facilitate earlier payment of the bill that in turn would improve the cash position of the company. Such timely delivery may mitigate the risk of negative impact on cash flow or lost opportunity for new revenue for the billing company. Furthermore, it may be desirable to ensure timely delivery of many types of business communication including business-critical documents by leveraging the illustrative embodiments herein including multiple delivery channels such as by using an initial electronic delivery channel and backup physical channels.

Moreover, companies may wish to increase the use of electronic communications in a cost reduction effort to reduce costs associated with processing and sending physical communications such as in an automated document factory with associated postal delivery costs. Such print/mail suppression cost savings efforts may increase with increasing customer acceptance and adoption of electronic delivery of business communications such as monthly account statements. Companies, customers and communications processing vendors may also look to the proper use of electronic delivery channels in ongoing attempt to reduce the ecological impact of such communications. Certain print-to-mail systems are available from the Pitney Bowes Emtex and Pitney Bowes Business Insight subsidiaries of Pitney Bowes Inc. located in Stamford, Conn. Systems herein may utilize printstream processing systems, document printing, insertion and franking systems and electronic bill presentment and payment (EBPP) systems available from Pitney Bowes Inc.

Certain outgoing mail printstream processing systems have been described for separating documents in a printstream or batch into two separate printstreams—a physical delivery printstream and an electronic delivery printstream based on customer delivery preferences. Commonly-owned U.S. Pat. No. 6,343,327, entitled System and Method for Electronic and Physical Mass Mailing, issued to Daniels, Jr., et al. on Jan. 29, 2002 describes such systems and is incorporated by reference herein in its entirety. Such systems described therein may be modified using the systems, processes and techniques described herein to provide an initial delivery channel with a backup channel that is used when deemed necessary.

In a typical customer electronic mail system, an email box assigned to address johndoe@email.net receives email from many sources. For example, all of a customer's electronic messages directed to that account are mixed together so that personal communications, business transactional communications, general business communications and promotional business communications are sent to the same in box. Moreover, certain important electronic messages may be filtered by SPAM filters associated with the customer's email server.

Customer communications such as statements or targeted personalized marketing messaged are critical to business growth and cash flow. There is a growing trend toward electronic delivery of these documents driven by both sender and recipient demand. There are inherent issues with electronic delivery options that may affect the delivery to end customers, resulting in negative impact on cash flow to businesses, and imposed penalties or lost opportunities for customers. The illustrative embodiments described herein centralize document delivery from an output management system using multiple channels based on sender preference, customer preference, and delivery confirmation. Based on delivery responses from one channel (i.e. electronic, FAX, physical mail, etc), delivery of the same document via an alternative channel(s) will be automatically triggered to ensure timely delivery of these business-critical documents. For example, if an electronically delivered document is not responded to within 2 days, a physical version is created and sent to the recipient by first class mail to John Doe, 123 Main Street, Anywhere, Conn. 99999.

Variable data documents that are printed and mailed (i.e. statements, invoices, targeted marketing communications) contain time sensitive information. It is essential for document owners (senders) to ensure delivery of these documents to their customers. Traditionally, these documents are printed and mailed to customers. A growing number senders and customers are seeking electronic delivery options. When delivered electronically, the messages may get filtered, lost or ignored along with other electronic communications. The lost/ignored messages can cause payment or purchasing delays that have negative cash flow impact to the sender and penalties or lost opportunities for customers. This illustrative embodiments described herein enable senders to reliably deliver communications to their customers using a combination of electronic and physical delivery channels, keeping track of delivery/receipt on one channel (i.e. electronic) and automatically triggering alternate delivery via the other channel (i.e. physical print & mail).

Referring to FIG. 1, a system and information flow 100 for providing redundant customer communications delivery using hybrid delivery channels according to an illustrative embodiment of the present application is shown. In certain illustrative embodiments, the system uses traditional print/mail processes and systems that senders use today for their physical hardcopy delivery channel. Instead of implementing electronic delivery options at the IT/document pre-production stage, the electronic delivery preference database will be made available for the production processes. Prior to printing and mailing the documents, the output management system will create a document data stream in any desired format (AFP, PDF, PS, etc) along with meta data (such as mail piece identifiers, delivery address, account data, etc) that will be extracted from the documents. The data stream and meta data is sent to an electronic delivery channel (either in its entirety, or only for those customers who opt for electronic delivery). Once messages are delivered to an electronic channel, the user events (such as message delivered, opened, read, printed, deleted, response received, etc) will be logged by the electronic delivery providers. The system will receive and/or request/read these events as they occur or on a periodic basis. A list of documents that have not been delivered, opened, responded to or otherwise accessed will be complied. Based on the unique document identifiers, a second new document output production job will be created for these documents and will generally be sent using another secondary channel. For example, documents initially delivered in an electronic channel such as push to client email may be submitted for redelivery using a secondary channel such as hard copy print/mail production or alternative electronic delivery options (such as facsimile delivery).

A Mailer operating the system 100 may be a medium to large company operating an internal automated document factory to process customer communications. Alternatively, a Mailer may include an outsourced mailing company processing outgoing communications for one or more companies. Similarly, the systems and processes described may be used by small companies or individuals and may be used with print-to-mail systems and services.

The system and process flow 100 of FIG. 1 depicts subsystems that will interact and produce initial and subsequent communication runs. Several subsystems are described in the physical/electronic automated document factory (ADF) described herein. The servers described are typically INTEL architecture servers using the WINDOWS SERVER operating system software. Additionally, the illustrative embodiments are described as enhancements to previously commercially available software systems marketed by EMTEX available from Pitney Bowes Inc. of Stamford, Conn. The EMTEX PRODUCTION INTELLIGENCE (P/I) Workflow Solutions for print and mail operations includes the VIP, VDE, and FLEXSERVER output management solutions and the DFWORKS ADF Management software that facilitates a powerful integration with Pitney Bowes inserters, sorters and output management systems. The EMTEX Virtual Intelligent Presentation (VIP) and Virtual Document Enhance (VDE) software help print operations fully maximize their document production infrastructure. The EMTEX Production Intelligence (PI) Workflow Solutions for print and mail operations facilitate the P/I Wizard software system.

The modified Output Management System 110 includes a server such as a DELL POWEREDGE server with the WINDOWS server and ORACLE database software. Appropriate security, load balancing and redundancy may be employed. The Document Configuration 103 is typically user input through an appropriate user terminal such as a LAN or Internet connected DELL PC (not shown) using a graphical user interface (GUI) to configure the system using the printstream editor 114. Recipient (or customer, government citizen, etc.) has delivery preferences stored in delivery preference database 112. Known delivery preference systems may be employed and include a preference selection to split a document job batch between channels such as a physical and electronic delivery channel. Alternatively, multiple physical and electronic delivery channels may be selected.

The printstream editor subsystem 114 then for a type of job will produce edit command codes 115 and a print list 117 (physical/electronic split) to be sent to the output management server 140. The output management server 140 provides runtime print job processing for a print stream or file 101. The print file 101 may be one of many types of files typically processed by ADFs such as legacy mainframe financial statement output or other document composition tool output. The print file may include pre-composed Portable Document Format (PDF) documents or may be in any one of several page description languages (PDLs) and may have been produced by any document composition software such as DOC1, EXTREME or DIALOG formats. The output management server 140 provides metadata extraction and converts print files from and one of several PDL formats for storage in the intermediate print format database 142. The output management subsystem performs document enhancement such as extracting elements and inserting elements such as barcodes and images in accordance with the edit commands 115. The printed portion of the job and modified print file 101 is then sent to the ADF 150 using channel 141 that is typically a LAN or Internet connection to an ADF that created physical mail pieces. Channel 141 is bi-directional because delivery tracking data such as USPS delivery tracking and confirmation data is provided back to the system 100 such as through channel 141. Other channels may be used and may directly communicate with subsystem 110. For example, hard copy may be transmitted 151 to a carrier such as a postal carrier 190 for delivery. The postal carrier 190 may then provide delivery status or other data regarding mail piece directly or indirectly through postal systems to output management system 110 using communications channel 191.

The printing/mailing (hard copy) subsystem 150 is implemented in the illustrative embodiment as an automated document factory (ADF) using mail piece creation systems described may be obtained from Pitney Bowes Inc. of Stamford, Conn. that include the PITNEY BOWES SERIES 8/9/10/11, FPS, APS and MPS, inserter systems. The Automated Document Factory (ADF) includes suitable printers such as the PITNEY BOWES INTELLIJET printing system, the KODAK VERSAMARK V-SERIES Printing Systems or any print device coupled to or used with suitable PITNEY BOWES insertion systems and mail finishing systems. The documents may be letters franked using a PITNEY BOWES DM INFINITY postage meter or have postage evidenced using a permit print and associated manifest for induction into the USPS carrier system. The documents produced may include the full range of documents processed in ADFs including statements such as monthly or financial transaction statements of accounts, credit cards and brokerage accounts and may also include bills for services and utilities and goods purchased. The documents may include direct mail solicitations. Alternatively, document printing, customization and creation services may be obtained from Pitney Bowes Inc.

The output management server 140 provides the entire modified print file 119 with metadata 121 to the formatter/exporter 116. The formatter/exporter prepares an electronic version of those documents that will be sent electronically in the first instance and provides them to the E-Delivery Solutions server 160 using channel 105 such as by FTP in XML/PDL format to provide data export of meta data and a print file. Alternative appropriate formats and secure delivery channels may be utilized. The E-Delivery solution 160 may be an external system such as an e-messaging system available from the Pitney Bowes Business Insights group or may alternatively be built into the server 110. The E-Delivery solutions server 160 then sends the email documents (statements, etc.) via push email or other electronic delivery to the customer (not shown) and received delivery data such as return receipt or other responses such as payment notice that may be delivered back to server 110 through channel 107. Additionally, alternative response channels may be used and may communicate directly with server 110. The formatter/exporter 116 also stores a copy of all the documents in statement database 118 using internal channel 123.

Based upon at least the responses 107, a secondary mailing job is created to provide selective redundant customer communications delivery using hybrid delivery channels for use after the initial delivery channel with a separate, delayed backup delivery channel that is used only when deemed necessary by appropriate business rules for the document delivery job. The responses may include when the document was received, who received the document and whether a desired action was taken by the recipient in response to receiving the message. The business rules may vary as appropriate for the type of document communication. For example, if an email bill is not opened and/or responded to within two days, a backup physical mailing may be used. Similarly, if a bill has not been paid within two days of delivery of the related statement, the backup physical mailing may be used. In another alternative, two indicators are used. A first indication is provided indicating that the primary communication has been received and opened. The first indication starts a period for determining when a second indication must be received such as payment of a bill associated with the receipt of the primary communication. For example, if the primary communication is opened after two days, then bill payment should be received within one additional day. If not, the secondary communication is sent. Furthermore, a total limit of time such as four days is applied for receipt of the second indication before the secondary mailing is sent. Alternative time periods such as one say, three days, four days or one week may be used in the above examples as appropriate.

The business rules and response data is used to generate a selective, redundant print list at subsystem 120 and those statements are received from statement database 125. A redundant physical channel subset 127 and a redundant electronic channel subset 129 including a meta data and print file are created and sent to the respective processing systems 140, 170. Secondary electronic delivery processing server 170 may be a separate system than 160 or may be included in that system. The secondary electronic system 170 enable different electronic delivery channels such as facsimile and/or automated telephone calling. If a secondary electronic channel is not available for a particular document, the system may fallback to a physical mailing for that document. The secondary physical print file 143 may be processed by ADF 150 or a separate ADF designed to process secondary communications such as by aggregating separate secondary print runs to maximize postal delivery cost discounts. Accordingly, the initial document job mailing may not be aggregated while the secondary run is aggregated.

The systems and processes described herein may be thought of as having three stages. An initial stage includes all of the processes required to generate the first document (statement, etc.) distribution to the customer using the first pass delivery channels such as USPS mail and email to a primary customer email address. The second stage is receipt and analysis of first pass delivery data such as USPS delivery confirmation data, email return receipt messages and customer action notifications such as bill paid notifications. The second stage involves using the response data to determine how to deliver a second pass communication. User preferences or other historical performance data may be used to make that determination. The second pass channel selected may be applied only to the documents originally sent by email or may apply to all of the documents. When applied at least in part to email, the second pass delivery channel my be a physical mailing or a different electronic channel such as facsimile, text message or automated telephone call to the customer. The value associated with the document (e.g., a bill) may be used to select the secondary channel. For example, if the outstanding balance of the bill is less than $10, the secondary channel may include a low cost option such as a repeat email to a secondary email address, an automated telephone call or facsimile message. If the outstanding balance of the bill is more than or equal to $10, the system may use a secondary channel of first class mail.

Figure 2:
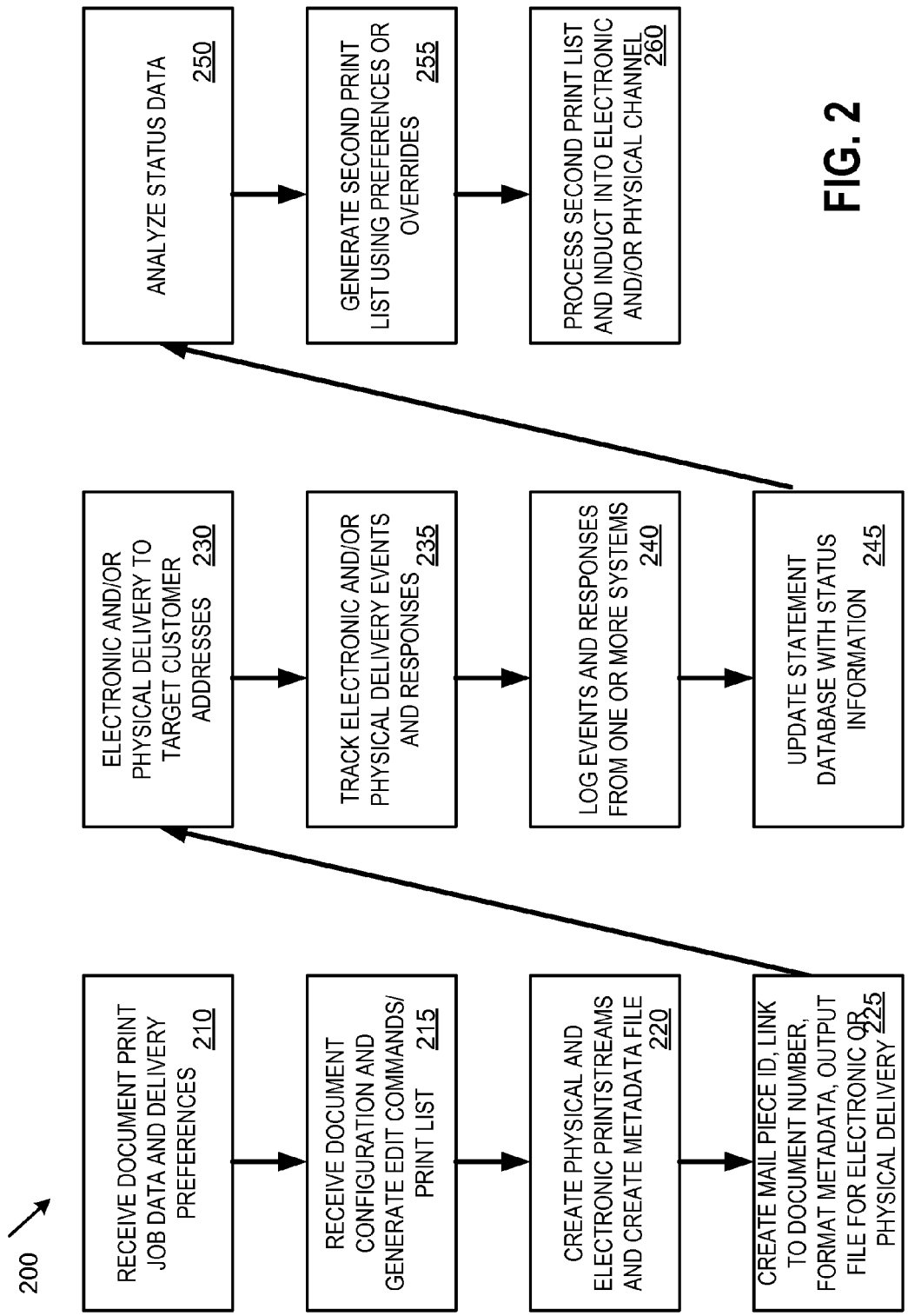
FIG. 2 is a flow diagram showing a process for providing redundant customer communications delivery using hybrid delivery channels according to an illustrative embodiment of the present application.

Referring to FIG. 2, a flow diagram showing a process 200 for providing redundant customer communications delivery using hybrid delivery channels according to an illustrative embodiment of the present application is shown. In one example, a mailer is a credit card company that uses the ADF system herein to mail credit card statements to its customers.

The credit card company would prefer timely delivery of the statements and timely action on the statements such as receipt of the statement and payment by the customer.

In step 210, the system receives document print job data and delivery preference data from a particular mailer. For example, the mailer may make an electronic and physical delivery database available to the output management system or the ADF operator may generate and maintain such a database. The mailer then provides print jobs as appropriate for processing in accordance with the database. In an alternative embodiment, the ADF described is operated by the mailer directly and thus the information received for the print job is internal to the organization. In step 210, the system receives document configuration and generate edit commands/print lists. For example, a print analyst with the mailer or ADF company will configure document extraction parameters (such as account, address, etc) using the printstream editor and that data will be received by the system 100. The printstream editor will generate the code to extract required data from the print statements and the printstream editor will also generate the list of statements to be printed based on print suppression preferences (electronic/print document stream split that may be opt-in, etc.).

In step 220, the output management control subsystem will create print streams for electronic and physical delivery channels based on desired output formats and the output management control subsystem will extract required data from print stream and create the appropriate metadata file. In step 225, the output management control system will create a unique ID for each mail piece and link it with a document number for the job. The output management control system will format the metadata in desired format for electronic delivery provider and then will send the print file and meta data to electronic delivery provider.

In step 230, the electronic delivery provider publishes the electronic statements to target addresses such as by sending an email to the recipients. The electronic recipient may receive email addressed to their physical address such as described in U.S. Pat. No. 7,478,140, entitled system and method for sending electronic mail and parcel delivery notification using recipient's identification information and issued on Jan. 13, 2009 to King, et al. that is incorporated herein by reference in its entirety.

In step 235, the electronic delivery provider, mailer, and/or ADF operator keeps track of user events/status (such as message opened, read, printed, discarded, bill payment received, etc). In step 240, electronic delivery provider, mailer, and/or ADF operator will log these events for each unique statement/mail piece identifier and make these available to output management control system. The event notifications may be received from other systems including biller and mailer websites. In step 245, the output management control system will update database for each statement to associated the status data with each bill.

In step 250, the output management control system will analyze the status data such as on a periodic basis or in accordance with ADF availability data or postal discount data. For example, a secondary mailing may be aggregated with other ADF mailing or synchronized with postal or other carrier discounts. For example, based on configurable time period, the output management control system will generate a subset list of statements that have not been acknowledged through the electronic delivery channel.

In step 255, the output management control creates the selective, redundant subset select list and sends this list to output management system. The secondary subset list may be used to create the backup physical mail piece or may be used to send an alternate electronic delivery mechanism such as FAX based on customer alternative preferences or fallback channel selections. In step 260, the output management system uses local printdata (intermediate print format) and recreates a print file for the selected statements. The select list will be printed and mailed using the physical channel.

In an alternative embodiment applicable as appropriate with any of the embodiments herein, the system will deliver all mail electronically and delay physical delivery by several hours or a day. The system will then obtain response data including opening data or response data such as noting a bill paid. Thereafter, the system will remove recipients as appropriate based upon customer action and response to the electronic mailing and then create the physical delivery list based excluding those customers who have already taken appropriate action. Accordingly, the physical list may be a significantly shorter list than the original full electronic list.

In another alternative embodiment applicable as appropriate with any of the embodiments herein, the system will update the delivery preference database 112 based on the customer user events on the electronic delivery channel. For example, if the customer does not respond to electronic notification timely a set number of times such as 2, that customer's preference for electronic delivery will be switched to physical delivery to promote earlier customer action such as earlier bill payment.

In yet another alternative embodiment applicable as appropriate with any of the embodiments herein, the system will provide for a third round of delivery or more as necessary.

The various systems and subsystems described herein may alternatively reside on a different configuration of hardware such as a single server connected to an ADF and email channel with appropriate modifications. Geocoding and statement generation systems described herein such as the customizable DOC1 suite and the GEOSTAN system may be obtained from Pitney Bowes Software, Inc. of Lanham, Md. Encryption, digital signature and challenge/response data creation systems described may be obtained from the RSA division of EMC of Bedford, Mass. Alternatively, the described systems may be developed using general purpose software development tools including Java and/or C++ development suites. The server systems described herein typically include WINDOWS/INTEL Servers such as a DELL POWEREDGE Server and include database software including ORACLE 10i software. Alternatively, other servers such a SUN FIRE T2000 and associated web server software such as SOLARIS and JAVA ENTERPRISE and JAVA SYSTEM SUITES may be obtained from several vendors including Sun Microsystems, Inc. of Santa Clara, Calif. PC. Alternative database systems such as SQL may be utilized. The user computing systems described may include WINDOWS/INTEL architecture systems running WINDOWS and INTERNET EXPLORER BROWSER such as the DELL DIMENSION E520 available from Dell Computer Corporation of Round Rock, Tex. While the electronic communications networks have been described as physically secure local area network (LAN) connections in a facility, external or wider area connections such as secure Internet connections may be used. Other communications channels such as Wide Area Networks, telephony and wireless communications channels may be used. Furthermore, while the USPS physical delivery system has been described, other physical delivery systems such as courier systems may be used.

Although the invention has been described with respect to particular illustrative embodiments thereof, it will be understood by those skilled in the art that the foregoing and various other changes, omissions and deviations in the form and detail thereof may be made without departing from the scope of this invention.

What is claimed is:

1. A computer system for providing selective redundant customer communications using a first communications channel and a second communications channel comprising:
   a customer communications computer processing subsystem configured to create a first set of documents including a first subset directed to a first communications channel and a second subset directed to a second communications channel;
   a computer processing subsystem for obtaining status data related to at least the second subset, wherein the status data comprises an indication of customer response to the customer communications; and
   a computer processing subsystem for creating a redundant subset of the second subset of customer communications based upon the status data and time data.

2. The system of claim 1, further comprising:
   a subsystem for processing the redundant subset of customer communications using a third communications channel.

3. The system of claim 1, further comprising:
   a subsystem for processing the redundant subset of customer communications using the first communications channel.

4. The system of claim 1, wherein:
   the first communications channel comprises a physical delivery channel, the second communications channel comprises an electronic delivery channel and the customer communication comprises a periodic statement.

5. The system of claim 4, wherein:
   the status data includes an indication of receipt of the periodic statement or an indication of customer response received associated with the statement.

6. The system of claim 4, wherein:
   the physical delivery channel comprises a postal service, the second communications channel comprises an electronic mail delivery channel.

7. The system of claim 4, wherein:
   the status data includes an indication of customer response received associated with the periodic statement including an indication that a payment has been received related to the periodic statement.

8. The system of claim 4, wherein:
   the status data includes failure to receive an indication that a payment related to the periodic statement was received within a first period of time; and
   wherein the subsystem for creating the redundant subset of the second subset of customer communications utilizes the status data, time data and the amount of the payment due to create the redundant subset of the second subset of customer communications.

9. The system of claim 1, wherein:
   the status data includes an first indication and a second indication based upon the first indication.

10. The system of claim 4, wherein:
    the status data includes an first indication and a second indication based upon the first indication; and
    the first indication relates to an opening event associated with one of the first set of documents and the second indication includes an indication of failure to receive a payment related to the periodic statement within a first period of time after the first indication.

11. A computer implemented method for providing selective redundant customer communications using a computer, a first communications channel and a second communications channel comprising:
    creating, using the computer, a first set of documents including a first subset directed to a first communications channel and a second subset directed to a second communications channel;
    obtaining status data related to at least the second subset, wherein the status data comprises an indication of customer response to the customer communications; and
    creating, using the computer, a redundant subset of the second subset of customer communications based upon the status data and time data.

12. The method of claim 11, further comprising:
    processing the redundant subset of customer communications using a third communications channel.

13. The method of claim 11, further comprising:
    processing the redundant subset of customer communications using the first communications channel.

14. The method of claim 11, wherein:
    the first communications channel comprises a physical delivery channel, the second communications channel comprises an electronic delivery channel and the customer communication comprises a periodic statement.

15. The method of claim 14, wherein:
    the status data includes an indication of receipt of the periodic statement or an indication of customer response received associated with the statement.

16. The method of claim 14, wherein:
    the physical delivery channel comprises a postal service, the second communications channel comprises an electronic mail delivery channel.

17. The method of claim 14, wherein:
    the status data includes an indication of customer response received associated with the periodic statement including an indication that a payment has been received related to the periodic statement.

18. The method of claim 14, wherein:
    the status data includes failure to receive an indication that a payment related to the periodic statement was received within a first period of time; and
    wherein the subsystem for creating the redundant subset of the second subset of customer communications utilizes the status data, time data and the amount of the payment due to create the redundant subset of the second subset of customer communications.

19. The method of claim 11, wherein:
    the status data includes an first indication and a second indication based upon the first indication.

20. The method of claim 14, wherein:
    the status data includes an first indication and a second indication based upon the first indication; and
    the first indication relates to an opening event associated with one of the first set of documents and the second indication includes an indication of failure to receive a payment related to the periodic statement within a first period of time after the first indication.

* * * * *